United States Patent
Ito et al.

(10) Patent No.: US 10,916,360 B2
(45) Date of Patent: Feb. 9, 2021

(54) METHOD FOR MANUFACTURING AN ELECTRICAL WIRE

(71) Applicant: Yazaki Corporation, Tokyo (JP)

(72) Inventors: Yuto Ito, Utsunomiya (JP); Yoshio Shionome, Utsunomiya (JP); Takashi Oguri, Utsunomiya (JP); Jin Omori, Utsunomiya (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/292,971

(22) Filed: Mar. 5, 2019

(65) Prior Publication Data
US 2019/0279790 A1 Sep. 12, 2019

(30) Foreign Application Priority Data

Mar. 7, 2018 (JP) ................................ 2018-041023

(51) Int. Cl.
*H01R 43/00* (2006.01)
*H01B 7/18* (2006.01)
(Continued)

(52) U.S. Cl.
CPC ........... *H01B 7/18* (2013.01); *B60R 16/0207* (2013.01); *B60R 16/0215* (2013.01);
(Continued)

(58) Field of Classification Search
CPC .......... H01B 7/18; H01B 7/009; H01B 19/04; H01B 13/228; H01B 13/22; H01B 13/01263; H01B 13/012; H01B 7/0045; H02G 3/04; B60R 16/0207; B60R 16/0215; Y10T 29/49117; Y10T 29/49195
(Continued)

(56) References Cited

U.S. PATENT DOCUMENTS 5,530,625 A * 6/1996 VanDerStuyf ......... H05K 7/026
174/255
7,094,970 B2 8/2006 Kihira
(Continued)

FOREIGN PATENT DOCUMENTS

| DE | 102006050705 A1 | 4/2008 |
|---|---|---|
| DE | 102006062795 B4 | 10/2010 |
| JP | 2004-171952 A | 6/2004 |

OTHER PUBLICATIONS

Jul. 29, 2019—(EP) Extended Search Report—App 19159626.1.

*Primary Examiner* — Donghai D Nguyen
(74) *Attorney, Agent, or Firm* — Banner & Witcoff, Ltd.

(57) ABSTRACT

There is provided a method for manufacturing an electrical wire. The electrical wire includes a rod-like conductor having a shape corresponding to a predetermined wiring route and also having rigidity to enable the rod-like conductor to maintain the shape, and an insulation sheath covering the rod-like conductor. The method includes: preparing a plurality of rod-like preliminary conductors having the rigidity so as to correspond to a plurality of sub routes into which the wiring route is divided; processing at least one of the plurality of preliminary conductors into a shape conforming to the corresponding sub routes; connecting the plurality of preliminary conductors together to form the rod-like conductor; and forming the insulation sheath to cover the rod-like conductor.

3 Claims, 5 Drawing Sheets

(51) Int. Cl.
  *H01B 19/04* (2006.01)
  *H01B 7/00* (2006.01)
  *B60R 16/02* (2006.01)

(52) U.S. Cl.
  CPC ............ *H01B 7/009* (2013.01); *H01B 19/04* (2013.01); *H01B 7/0045* (2013.01); *Y10T 29/49194* (2015.01)

(58) Field of Classification Search
  USPC .......................................... 29/825, 868, 869
  See application file for complete search history.

(56) References Cited

U.S. PATENT DOCUMENTS

| | | | |
|---|---|---|---|
| 9,177,695 B2 * | 11/2015 | Lietz | H01B 7/08 |
| 9,197,042 B2 * | 11/2015 | Toyama | H02G 3/0406 |
| 9,643,545 B2 * | 5/2017 | Oga | B60R 16/0215 |
| 2004/0099427 A1 | 5/2004 | Kihira | |
| 2009/0104514 A1 | 4/2009 | Lietz et al. | |
| 2016/0129861 A1 | 5/2016 | Oga et al. | |
| 2016/0152197 A1 | 6/2016 | Kugimiya et al. | |

* cited by examiner

METHOD FOR MANUFACTURING AN ELECTRICAL WIRE

CROSS-REFERENCES TO RELATED APPLICATIONS

This application is based on and claims priority from Japanese Patent Application No. 2018-041023 filed on Mar. 7, 2018, the entire contents of which are incorporated herein by reference.

FIELD

One or more embodiments of the present invention relate to a method for manufacturing an electrical wire, and an electrical wire.

BACKGROUND

A wire harness configured to insert a plurality of electrical wires into a hollow portion of a metal pipe as a bundle is known, in which the electrical wires connect between various components (battery, inverter, motor and the like) of an electrical drive system such as a hybrid automobile and an electric automobile (see, for example, JP-A-2004-171952).

SUMMARY

The wire harness of the related art described above includes a metal pipe formed in a shape corresponding to the wiring route so that the wires are easily arranged into the wiring route. However, such a wire harness requires that a long metal pipe for inserting the electrical wires therein be processed into a complicated shape corresponding to the wiring route, and such processing requires time and labor. Further, with such a wire harness, it is necessary to insert a plurality of electrical wires through the hollow portions of the metal pipe processed into a complicated shape, which also requires time and labor for the insertion work.

One or more embodiments of the present invention have been made in consideration of the issues mentioned above, and accordingly, and is to provide a method capable of manufacturing an electrical wire with excellent wiring workability with ease, and an electrical wire with excellent wiring workability that can be manufactured with ease.

In order to achieve the above-described object, a method for manufacturing an electrical wire according to one or more aspects of the present invention is summarized as the below-described (1) to (3).

(1) A method for manufacturing an electrical wire, the electrical wire including a rod-like conductor having a shape corresponding to a predetermined wiring route and also having rigidity to enable the rod-like conductor to hold the shape by itself, and an insulation sheath covering the rod-like conductor, the method including:

preparing a plurality of rod-like preliminary conductors having the rigidity so as to correspond to a plurality of sub routes into which the wiring route is divided;

processing at least one of the plurality of preliminary conductors into a shape conforming to the corresponding sub routes;

connecting the plurality of preliminary conductors to form the rod-like conductor; and forming the insulation sheath to cover the rod-like conductor.

(2) The method for manufacturing an electrical wire according to (1), wherein the electrical wire includes a plurality of the rod-like conductors having a shape corresponding to the wiring route, and wherein when the insulation sheath is formed, the insulation sheath is formed to cover and bundle the plurality of rod-like conductors such that the plurality of rod-like conductors are integrated.

(3) The method for manufacturing an electrical wire according to (1) or (2), wherein when the rod-like conductor is formed, the plurality of preliminary conductors are connected by at least one of ultrasonic bonding, crimping, pressure welding, and joining using an attachment.

According to a method for manufacturing the electrical wire having configuration (1) described above, at least one of a plurality of rod-like preliminary conductors is processed into a shape conforming to the corresponding sub route. Once processed, the preliminary conductor is capable of holding the processed shape by itself. These preliminary conductors are connected to form a rod-like conductor, and then an insulation sheath is formed to cover the rod-like conductor. Accordingly, it is possible to obtain the electrical wire, in which the rod-like conductor is covered with the insulation sheath, the conductor having a shape corresponding to a predetermined wiring route and also having rigidity that allows the rod-like conductor to hold shape by itself. With the electrical wire manufactured as described above, it is possible to easily manufacture the electrical wires with excellent wiring workability in the wiring route, compared to a wire harness (electrical wire) that is manufactured by processing the long pipe as described above into a predetermined shape and then inserting an electrical wire thereinto.

Further, since at least one of the preliminary conductors corresponding to the plurality of sub routes is processed to correspond to the shape of the wiring route, and these preliminary conductors are connected to each other, it is possible to improve the workability of processing and contribute to facilitated manufacturing.

"Rigidity" described above represents the force (load/deformation amount) necessary to cause a unit deformation of an object, and represents the degree of difficulty to deform the object. Rigidity includes bending rigidity, shear rigidity, torsional rigidity, and the like.

According to a method for manufacturing the electrical wire having configuration (2) described above, it is possible to bundle and integrate a plurality of rod-like conductors with an insulation sheath. As a result, electrical wires that correspond to a plurality of circuits can be easily manufactured.

According to the method for manufacturing the electrical wire having the configuration (3) described above, it is possible to easily manufacture the electrical wires including rod-like conductors shaped corresponding to the wiring route by easily connecting the preliminary conductors to each other with at least one of ultrasonic bonding, crimping, pressure welding, and joining using an attachment. Accordingly, electrical wires having a shape corresponding to the wiring route can be manufactured without requiring complicated processing.

In order to achieve the above-described object, an electrical wire according to one or more aspects of the present invention is summarized as the below-described (4).

(4) An electrical wire including:

a rod-like conductor having a shape corresponding to a predetermined wiring route and also having rigidity to enable the rod-like conductor to hold the shape by itself; and an insulation sheath covering the rod-like conductor, wherein the rod-like conductor is formed by connecting a plurality of rod-like preliminary conductors with each other, the plurality of rod-like preliminary conductors having the rigidity and corresponding to a plurality of sub routes into which the wiring route is divided.

According to the electrical wire having the configuration (4) described above, the wire can hold a shape corresponding to a predetermined wiring route by itself, and accordingly, it is possible to improve the wiring workability when wiring into the automobile body, or the like.

According to one or more aspects of the present invention, it is possible to provide a method for manufacturing an electrical wire having excellent wiring workability with ease, and an electrical wire with excellent wiring workability that can be manufactured with ease.

One or more aspects of the present invention have been briefly described above. Furthermore, the details will be further clarified by reading through the aspects for carrying out the invention (hereinafter referred to as "an embodiment") described below with reference to the accompanying drawings.

BRIEF DESCRIPTION OF DRAWINGS

FIGS. 2A and 2B are provided to explain a wiring route and a structure of the electrical wires according to the embodiment, in which

FIGS. 3A to 3C are provided to explain a method for manufacturing the electrical wires according to the embodiment, in which

FIGS. 4A and 4B are provided to explain a covering process in a method for manufacturing an electrical wire, in which FIGS. 5A and 5B are provided to explain a modified example of an electrical wire, in which

DETAILED DESCRIPTION

Hereinafter, a method for manufacturing an electrical wire and the electrical wire according to an embodiment of the present invention will be described with reference to the drawings.

Figure 1:
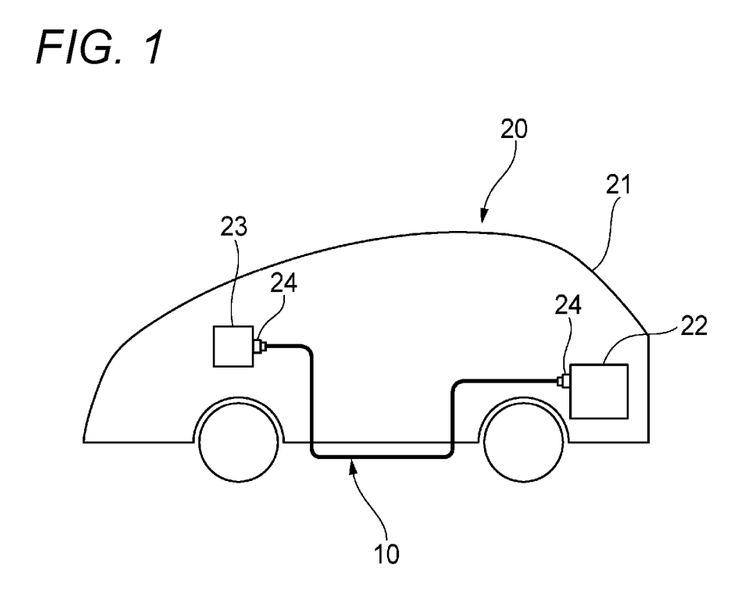
FIG. 1 is a schematic side view of an automobile in which electrical wires are wired, according to an embodiment.

FIG. 1 illustrates a hybrid automobile 20 with an electrical wire 10 installed therein, according to an embodiment of the present invention. Hereinafter, the hybrid automobile 20 is also simply referred to as "automobile 20".

As illustrated in FIG. 1, the automobile 20 includes a battery 22 disposed in a rear portion of an automobile body 21, and a power control unit 23 disposed in a front portion of the automobile body 21. The automobile 20 includes a generator motor (MG) and an internal combustion engine, both not illustrated. The generator motor generates power by the power supplied from the internal combustion engine. The generator motor is controlled by the power control unit 23.

The electrical wire 10 is connected to the battery 22 and the power control unit 23 by a connector 24. The battery 22 and the power control unit 23 are connected by the electrical wire 10 so as to be capable of supplying and receiving electric power.

Figure 2A:
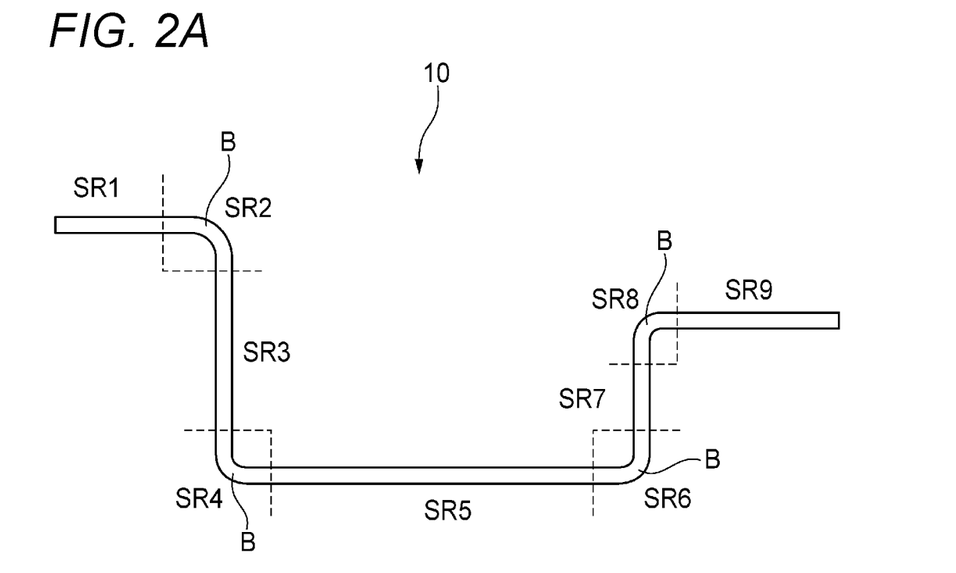
FIG. 2A is an overall view of the electrical wires formed in a shape corresponding to the wiring route.
Figure 2B:
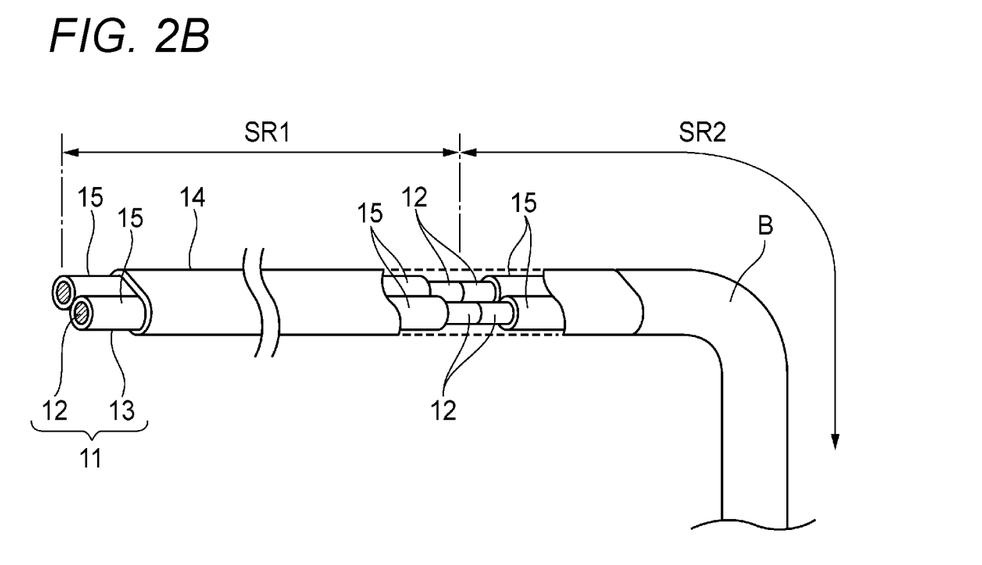
FIG. 2B is a perspective view of a portion of the electrical wires.

As illustrated in FIG. 2A, the electrical wire 10 has a shape corresponding to a predetermined wiring route to be wired into the automobile body 21, and is wired into the automobile body 21 in this shape. As illustrated in FIG. 2B, the electrical wire 10 includes a pair of rod-like conductors 11, and an insulation sheath 14 covering the pair of rod-like conductors 11. The pair of rod-like conductors 11 are covered and bundled together to be integrated by the insulation sheath 14.

For example, each of the rod-like conductors 11 includes a round bar conductor 12 made of aluminum or an aluminum alloy, with an outer circumference of the conductor 12 being covered with an insulation sheath 13. The rod-like conductor 11 has a shape corresponding to the predetermined wiring route described above, and also has rigidity to allow the rod-like conductor 11 to hold the shape corresponding to the wiring route by itself.

As illustrated in FIG. 2A, the wiring route of the electrical wire 10 in the automobile 20 is divided into a plurality of sub routes SR1 to SR9. The rod-like conductor 11 included in the electrical wire 10 is composed of a plurality of rod-like preliminary conductors 15 corresponding to the plurality of divided sub routes. In the present example, the rod-like conductor 11 is divided into sub routes SR1 to SR9 in order from one end side. Parts of the preliminary conductor 15 are processed into shapes conforming to each of the corresponding sub routes SR1 to SR9. Specifically, the preliminary conductors 15 of the sub routes SR1, SR3, SR5, SR7, and SR9 are formed as a straight line, and the preliminary conductors 15 of the sub routes SR2, SR4, SR6 and SR8 are processed into shapes having bends B.

The respective preliminary conductors 15 are connected to each other to form the rod-like conductor 11. The preliminary conductors 15 are connected by at least one of ultrasonic bonding, crimping, pressure welding, and joining using an attachment. Thus, the preliminary conductors 15 are electrically connected to each other. Portions of the conductors 12 are exposed through the insulation sheath 13 at the connections connecting the preliminary conductors 15, and the exposed conductors 12 are connected to each other. The preliminary conductors 15 are covered substantially entirely in the longitudinal direction by the insulation sheath 14, including the connections where the conductors 12 are exposed through the insulation sheath 13 and connected to each other.

Next, a method for manufacturing the electrical wire 10 having the configuration described above will be described. The following description will be given by exemplifying a certain part of the configuration that includes the sub route SR1 and the sub route SR2 of the electrical wire 10.

Figure 3A:
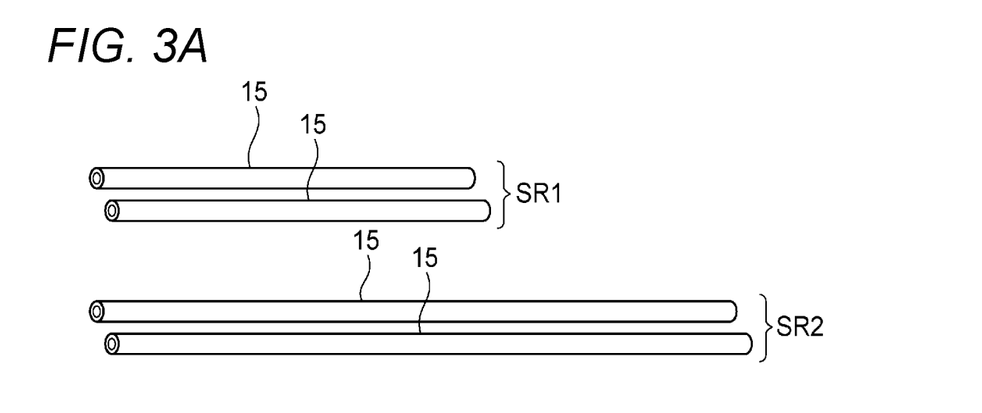
FIGS. 3A to 3C are perspective views of preliminary conductors in each step.
Figure 3B:
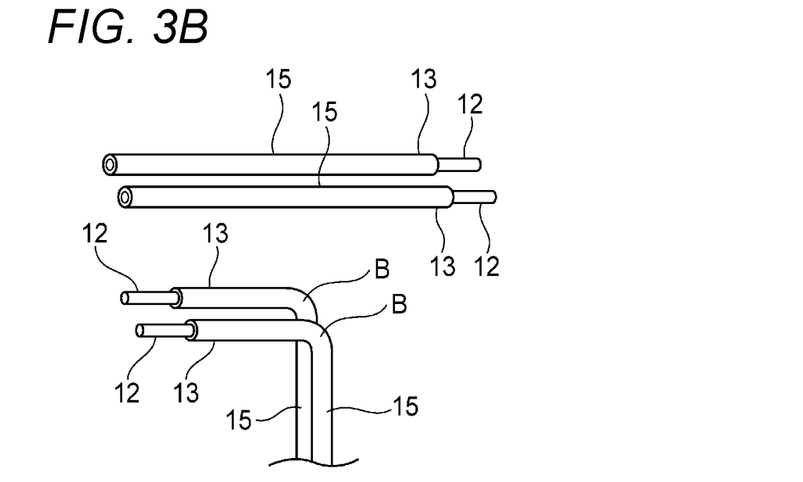
Figure 3C:
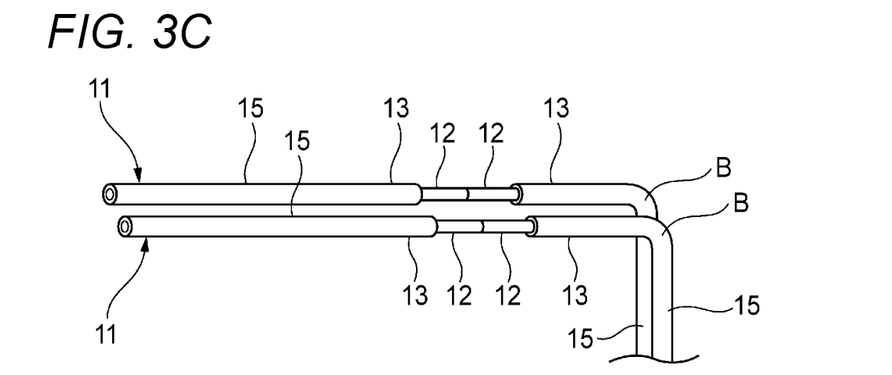
Figure 4A:
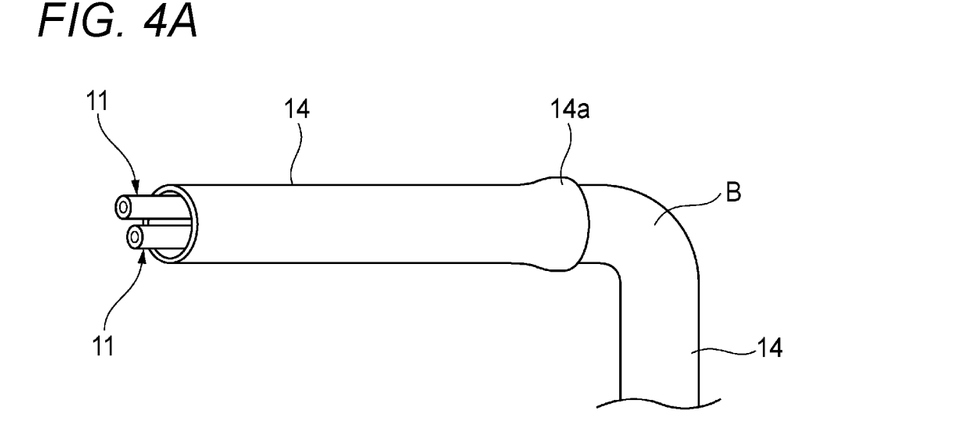
FIG. 4A is a perspective view of electrical wires before contraction of an insulation sheath.
Figure 4B:
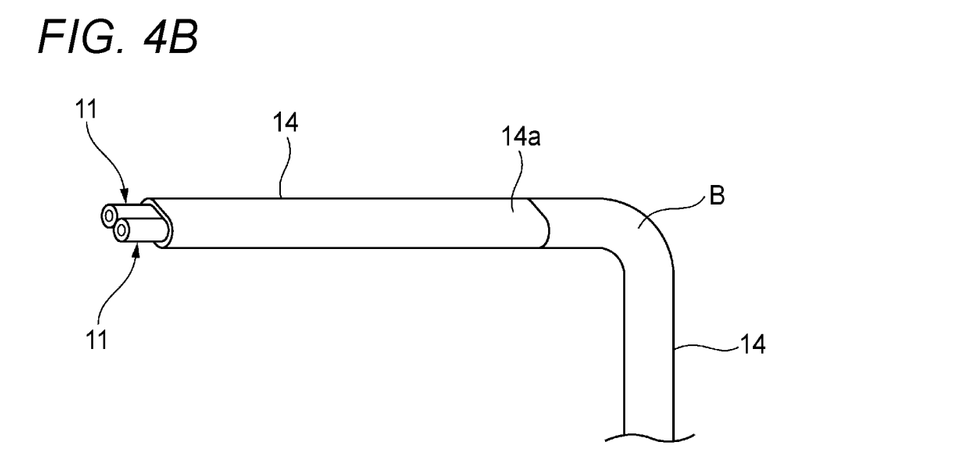
FIG. 4B is a perspective view of the electrical wire after contraction of the insulation sheath.

FIGS. 3A to 3C are views for explaining each step of the method for manufacturing the electrical wire according to the embodiment. FIGS. 4A and 4B are views for explaining covering step of the method for manufacturing the electrical wire.

Preliminary Conductor Preparation Step

The plurality of rod-like preliminary conductors 15 are prepared to correspond to the plurality of sub routes SR1 to SR9 into which the wiring route is divided. For example, as illustrated in FIG. 3A, a pair of preliminary conductors 15 corresponding to the sub routes SR1 and SR2 are prepared for each of the sub routes SR1 and SR2. The lengths of the preliminary conductors 15 are adjusted to correspond to the respective sub routes SR1 and SR2.

Processing Step

Predetermined portions of the plurality of preliminary conductors 15 are processed into shapes conforming to the sub routes SR1 to SR9. For example, as illustrated in FIG. 3B, the preliminary conductors 15 used for the sub route SR2 of the sub routes SR1 and SR2 are bent based on the shape of the sub route SR2 having the bend B. The insulation sheath 13 is removed from ends where the preliminary conductors 15 of the sub routes SR1 and SR2 are connected to each other, to expose the conductors 12.

Connecting Step

The plurality of preliminary conductors 15 are connected to form the rod-like conductor 11. For example, as illustrated in FIG. 3C, for the sub routes SR1 and SR2, the ends subjected to the terminal treatment of the preliminary routes 15 of the sub routes SR1 and SR2 are connected to each other. The conductors 12 of the preliminary conductors 15 are bonded to each other by ultrasonic bonding, for example. As a result, the preliminary conductors 15 of the sub routes SR1 and SR2 are electrically connected to each other.

Covering Step

The insulation sheath 14 is formed to cover the rod-like conductor 11 including the preliminary conductors 15. For example, for the sub routes SR1 and SR2, first, as illustrated in FIG. 4A, the insulation sheath 14 formed of a heat shrinkable resin is applied in a longitudinal direction on the pair of rod-like conductors 11 including the connections between the preliminary conductors 15 of the sub routes SR1 and SR2. Here, when the length of the insulation sheath 14 is shorter than the entire length of the rod-like conductor 11, as the overlapping portion 14a illustrated in FIG. 4A, a plurality of insulation sheaths 14 are applied on the rod-shaped conductors 11, and the ends of these insulation sheaths 14 are overlapped with each other. Next, the insulation sheaths 14 are heated to be shrunk. Thus, as illustrated in FIG. 4B, the pair of rod-like conductors 11 are covered and bundled together to be integrated by the insulation sheaths 14. Here, the respective insulation sheaths 14 are brought into close contact with each other without allowing any gaps at the overlapping portion 14a of the shrunk insulation sheaths 14. The insulation sheaths 14 may be formed of an ultraviolet curable resin or may be formed by tape winding.

As the steps described above are performed, the electrical wire 10 is obtained, in which a pair of rod-shaped conductors 11 having a shape corresponding to a predetermined wiring route and also having rigidity to allow the rod-like conductors 11 to hold the shape by themselves are covered and integrated with the insulation sheath 14.

As described above, according to a method for manufacturing the electrical wire according to the embodiment, at least one of a plurality of rod-like preliminary conductors 15 is processed into a shape conforming to the corresponding sub routes SR1 to SR9. The preliminary conductors 15 are connected to form a rod-like conductor 11, and then an insulation sheath 14 is formed to cover the rod-like conductor 11. Accordingly, it is possible to obtain the electrical wire 10, which is excellent in wiring workability, and in which the rod-like conductor 11 having a shape corresponding to a predetermined wiring route and also having rigidity that allows the rod-like conductor 11 to hold shape by itself is covered with the insulation sheath 14. That is, it is possible to manufacture the electrical wire 10 having excellent wiring workability in the wiring route with increased ease, compared to a wire harness in which a long metal pipe is processed into a shape corresponding to a wiring route and a wire is inserted through the metal pipe having the complicated shape.

It is possible to improve the workability of the processing and facilitate the manufacturing when compared with when at least one of the preliminary conductors 15 corresponding to the plurality of sub routes SR1 to SR9 is processed and then the one preliminary conductor 15 is processed according to the wiring route of a long rod-like conductor 11 to be connected.

In particular, since a plurality (in the present example, a pair) of rod-like conductors 11 can be integrated by the insulation sheath 14, the electrical wires 10 that can correspond to a plurality of circuits can be easily manufactured.

The plurality of preliminary conductors 15 are connected by at least one of ultrasonic bonding, crimping, pressure welding, and joining using an attachment. As a result, it is possible to easily manufacture the electrical wire 10, which includes the rod-like conductor 11 that easily connects the preliminary conductors 15 to each other and also has a shape corresponding to the wiring route.

For the electrical wire 10 according to the embodiment, since the electrical wire 10 has a shape corresponding to a predetermined wiring route and can hold the shape by itself, the wiring workability during wiring into the automobile body 21 can be improved.

Another Embodiment

The present invention is not limited to the embodiment described above, and various modifications can be adopted within the scope of the present invention. For example, the present invention is not limited to the embodiment described above, but may encompass modifications or improvements, as appropriate. Materials, shapes, dimensions, numbers, positions, and the like of the constituent elements in the embodiment above described are not limited, but rather arbitrary as far as the present invention can be achieved.

Figure 5A:
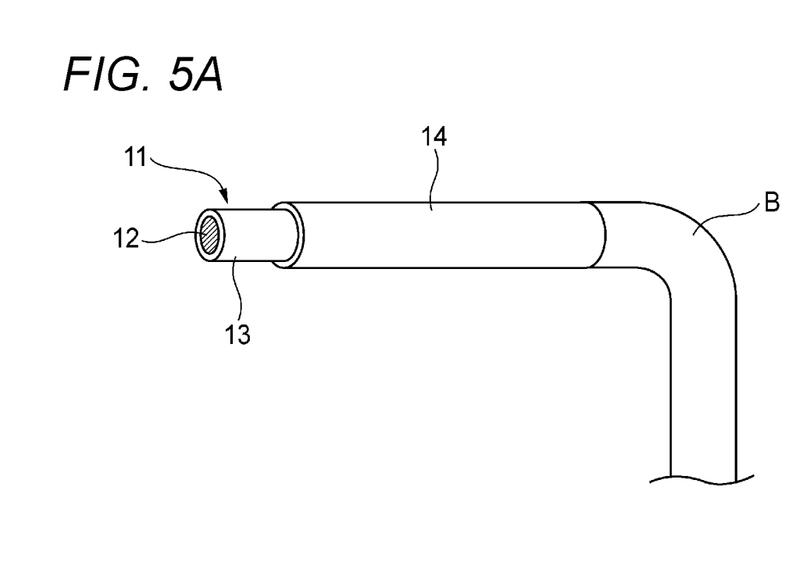
FIG. 5A is a perspective view of a portion of a rod-like conductor.

For example, the number of the rod-like conductors 11 included in the electrical wire 10 is not limited to a pair, but may be three or more, or may be one. FIG. 5A illustrates the electrical wire 10 composed of a single rod-like conductor 11. In the electrical wire 10, each one of the preliminary conductors 15 constituting the sub routes are connected to each other to form the rod-like conductor 11, and the rod-like conductor 11 including connections between each of the preliminary conductors 15 is covered by the insulation sheath 14 in the longitudinal direction.

Figure 5B:
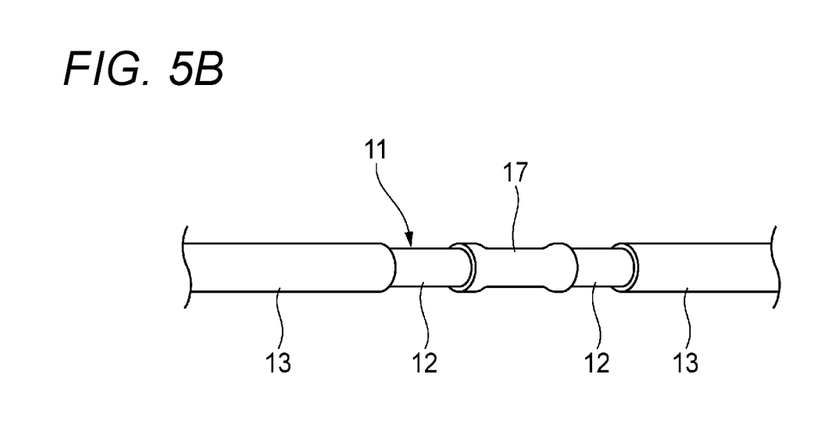
FIG. 5B is a perspective view of a connection between preliminary conductors constituting the rod-like conductor.

A method for connecting the preliminary conductors 15 of the rod-like conductor 11 is not limited to the ultrasonic bonding exemplified in the embodiment, but may be crimping, pressure bonding, or joining using an attachment. That is, the preliminary conductors 15 may be connected to each other by at least one of ultrasonic bonding, crimping, pressure welding, and joining using an attachment. In FIG. 5B, the conductors 12 of the preliminary conductors 15 are connected to each other by joining using an attachment 17. The attachment 17 is a tubular member made of a conductive metallic material, and both ends of the attachment 17 are crimped to the ends of the conductors 12 of the preliminary conductors 15, respectively. As a result, the preliminary conductors 15 are electrically connected to each other through the attachment 17.

When connecting the preliminary conductors 15 to each other by pressure welding, a connecting material made of zinc is interposed between end sections of the conductors 12 of the preliminary conductors 15, and the end sections of the conductors 12 of the preliminary conductor 15 may be heated under this condition while being pressed in a face-to-face direction. In this way, the end sections of the preliminary conductors 15 are pressed against each other, integrated, and electrically connected by the connecting member.

While the embodiment is described above with exemplifying a case where the rod-like conductor 11 made of aluminum or an aluminum alloy is used in the conductor 12, the conductor 12 of the rod-like conductor 11 may be made of a conductive metal material, or may be made of copper or a copper alloy, for example. When the conductor 12 is made of aluminum, the electrical wire 10 can be considerably reduced in weight as compared with the case where the conductor 12 is made of copper.

Here, the features of a method for manufacturing an electrical wire and the electrical wire according to one or more embodiments of the present invention described above are summarized briefly as (1) to (4) below.

(1) A method for manufacturing an electrical wire (10), the electrical wire (10) including a rod-like conductor (11) having a shape corresponding to a predetermined wiring route and also having rigidity to enable the rod-like conductor (11) to hold the shape by itself, and an insulation sheath (14) covering the rod-like conductor (11), the method including:

preparing a plurality of rod-like preliminary conductors (15) having the rigidity so as to correspond to a plurality of sub routes (SR1 to SR9) into which the wiring route is divided;

processing at least one of the plurality of preliminary conductors (15) into a shape conforming to the corresponding sub routes (SR1 to SR9);

connecting the plurality of preliminary conductors (15) to form the rod-like conductor (11); and forming the insulation sheath (14) to cover the rod-like conductor (11).

(2) The method for manufacturing an electrical wire (10) according to (1), wherein the electrical wire (10) includes a plurality of the rod-like conductors (11) having a shape corresponding to the wiring route, and wherein when the insulation sheath (14) is formed, the insulation sheath (14) is formed to cover and bundle the plurality of rod-like conductors (11) such that the plurality of rod-like conductors (11) are integrated.

(3) The method for manufacturing an electrical wire (10) according to (1) or (2), wherein when the rod-like conductor (11) is formed, the plurality of preliminary conductors (15) are connected by at least one of ultrasonic bonding, crimping, pressure welding, and joining using an attachment (17).

(4) An electrical wire (10) including:

a rod-like conductor (11) having a shape corresponding to a predetermined wiring route and also having rigidity to enable the rod-like conductor (11) to hold the shape by itself; and an insulation sheath (14) covering the rod-like conductor (11), wherein the rod-like conductor (11) is formed by connecting a plurality of rod-like preliminary conductors (15) with each other, the plurality of rod-like preliminary conductors (15) having the rigidity and corresponding to a plurality of sub routes (SR1 to SR9) into which the wiring route is divided.

The invention claimed is:

1. A method for manufacturing an electrical wire, the electrical wire comprising a rod-like conductor having a shape corresponding to a predetermined wiring route and also having rigidity to enable the rod-like conductor to maintain the shape, and an insulation sheath covering the rod-like conductor, the method comprising:

preparing a plurality of rod-like preliminary conductors having the rigidity so as to correspond to a plurality of sub routes into which the wiring route is divided;

processing at least one of the plurality of preliminary conductors into a shape conforming to the corresponding plurality of sub routes;

after the processing, connecting the plurality of preliminary conductors together to form the rod-like conductor; and after the connecting, forming the insulation sheath to cover the rod-like conductor, in a longitudinal direction, including the plurality of preliminary conductors and connections between each of the preliminary conductors.

2. The method for manufacturing an electrical wire according to claim 1, wherein the electrical wire comprises a plurality of the rod-like conductor having a shape corresponding to the wiring route, and wherein when the insulation sheath is formed, the insulation sheath is formed to cover and bundle the plurality of the rod-like conductor such that the plurality of the rod-like conductor are integrated.

3. The method for manufacturing an electrical wire according to claim 1, wherein when the rod-like conductor is formed, the plurality of preliminary conductors are connected together by at least one of ultrasonic bonding, crimping, pressure welding, and joining using an attachment.

* * * * *